(12) United States Patent
Schlub et al.

(10) Patent No.: US 9,300,342 B2
(45) Date of Patent: Mar. 29, 2016

(54) WIRELESS DEVICE WITH DYNAMICALLY ADJUSTED MAXIMUM TRANSMIT POWERS

(71) Applicant: Apple Inc., Cupertino, CA (US)

(72) Inventors: Robert W. Schlub, Cupertino, CA (US); Yi Jiang, Sunnyvale, CA (US); Qingxiang Li, Mountain View, CA (US); Digvijay Jadhav, Sunnyvale, CA (US); Matthew Fong, Sunnyvale, CA (US); Brian Mariner, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 13/865,578

(22) Filed: Apr. 18, 2013

(65) Prior Publication Data
US 2014/0315592 A1    Oct. 23, 2014

(51) Int. Cl.
*H04B 1/38*    (2015.01)
*H04B 1/3827*  (2015.01)
(Continued)

(52) U.S. Cl.
CPC .......... *H04B 1/3838* (2013.01); *H01Q 1/243* (2013.01); *H04B 1/04* (2013.01); *H04W 52/245* (2013.01); *H04W 52/367* (2013.01)

(58) Field of Classification Search
CPC ....... H01Q 1/243; H01Q 1/244; H01Q 1/245; H01Q 1/26; H04B 17/00; H04B 17/0002; H04B 17/003; H04B 17/0032; H04B 17/0035; H04B 17/0037; H04B 1/40; H04B 1/401; H04B 1/403; H04B 1/50; H04B 1/52
USPC ........ 455/522, 73, 41.2, 41.1, 572, 127.1, 69, 455/126, 155, 123, 129, 90.2, 435.1, 84, 455/101, 575.7, 566, 550, 13.4, 115, 550.1, 455/115.1; 343/876, 861, 860, 702, 658, 343/566; 324/679, 637, 658; 340/552, 540, 340/573.4, 600, 635; 370/275, 311, 297, 370/252, 281; 327/517; 345/173
See application file for complete search history.

(56) References Cited

U.S. PATENT DOCUMENTS

| 5,337,353 A | 8/1994 | Bole et al. |
| 5,463,406 A | 10/1995 | Vannatta et al. |

(Continued)

FOREIGN PATENT DOCUMENTS

| CN | 1452414 | 10/2003 |
| CN | 1696743 | 11/2005 |

(Continued)

OTHER PUBLICATIONS

Schlub et al., U.S. Appl. No. 13/865,578, filed Apr. 18, 2013.

(Continued)

*Primary Examiner* — Tan H Trinh
(74) *Attorney, Agent, or Firm* — Treyz Law Group, P.C.; G. Victor Treyz; Michael H. Lyons

(57) ABSTRACT

An electronic device may be provided with antenna structures. Proximity sensors and other sensors may be used in determining how the electronic device is being operated. Wireless circuitry such as a radio-frequency transmitter associated with a cellular telephone communications band, a wireless local area network band, or other communications band may be used in transmitting radio-frequency signals through the antenna structures at a transmit power. Control circuitry may adjust the wireless circuitry to ensure that the transmit power is capped at a maximum transmit power. The maximum transmit power may be adjusted dynamically by the control circuitry based on data from the proximity sensors, data from a magnetic sensor that detects whether a cover is present on the device, a connector sensor that detects whether the device is coupled to a dock or other accessory, and other sensors.

21 Claims, 9 Drawing Sheets

(51) Int. Cl.
 *H04B 1/04* (2006.01)
 *H04W 52/24* (2009.01)
 *H04W 52/36* (2009.01)
 *H01Q 1/24* (2006.01)

(56) References Cited

U.S. PATENT DOCUMENTS

| | | | | |
|---|---|---|---|---|
| 5,564,086 | A * | 10/1996 | Cygan et al. | 455/126 |
| 5,650,597 | A | 7/1997 | Redmayne | |
| 5,805,067 | A | 9/1998 | Bradley et al. | |
| 5,826,458 | A | 10/1998 | Little | |
| 5,854,972 | A | 12/1998 | Pennock et al. | |
| 5,864,316 | A | 1/1999 | Bradley et al. | |
| 5,905,467 | A | 5/1999 | Narayanaswamy et al. | |
| 5,956,626 | A | 9/1999 | Kashke et al. | |
| 6,151,563 | A * | 11/2000 | Marinelli | 702/141 |
| 6,285,893 | B1 | 9/2001 | Keidnbou | |
| 6,329,958 | B1 | 12/2001 | McLean et al. | |
| 6,380,899 | B1 | 4/2002 | Madsen et al. | |
| 6,408,193 | B1 | 6/2002 | Katagishi et al. | |
| 6,456,856 | B1 | 9/2002 | Wading et al. | |
| 6,529,088 | B2 | 3/2003 | Lafleur et al. | |
| 6,611,227 | B1 | 8/2003 | Nebiyeloul-Kifle et al. | |
| 6,657,595 | B1 | 12/2003 | Phillips et al. | |
| 6,678,532 | B1 | 1/2004 | Mizoguchi | |
| 6,862,433 | B2 | 3/2005 | Callaway | |
| 6,959,209 | B2 | 10/2005 | Fang | |
| 6,978,121 | B1 | 12/2005 | Lane et al. | |
| 6,985,113 | B2 | 1/2006 | Nishimura et al. | |
| 7,016,686 | B2 | 3/2006 | Spaling et al. | |
| 7,053,629 | B2 | 5/2006 | Nevermann et al. | |
| 7,109,945 | B2 | 9/2006 | Mori | |
| 7,113,087 | B1 | 9/2006 | Casebolt | |
| 7,146,139 | B2 | 12/2006 | Nevermann | |
| 7,181,251 | B2 | 2/2007 | Stohr et al. | |
| 7,499,722 | B2 | 3/2009 | McDowell et al. | |
| 7,522,846 | B1 | 4/2009 | Lewis et al. | |
| 7,633,076 | B2 | 12/2009 | Huppi et al. | |
| 7,826,875 | B2 | 11/2010 | Karaoguz et al. | |
| 7,834,813 | B2 | 11/2010 | Caimi et al. | |
| 7,999,748 | B2 | 8/2011 | Ligtenberg et al. | |
| 8,023,984 | B2 | 9/2011 | Jin et al. | |
| 8,159,399 | B2 | 4/2012 | Dorsey et al. | |
| 8,255,009 | B2 | 8/2012 | Sorenson et al. | |
| 8,326,221 | B2 | 12/2012 | Dorsey | |
| 8,417,296 | B2 * | 4/2013 | Caballero et al. | 455/566 |
| 8,432,322 | B2 | 4/2013 | Amm et al. | |
| 8,738,093 | B1 * | 5/2014 | Gopalakrishnan et al. | 455/572 |
| 8,749,523 | B2 | 6/2014 | Pence et al. | |
| 8,781,420 | B2 * | 7/2014 | Schlub et al. | 455/127.2 |
| 8,792,930 | B1 * | 7/2014 | Gopalakrishnan et al. | 455/522 |
| 8,818,450 | B2 | 8/2014 | Caballero et al. | |
| 8,989,792 | B1 * | 3/2015 | Depew | 455/522 |
| 9,088,953 | B2 * | 7/2015 | Bishop et al. | |
| 2002/0027474 | A1 | 3/2002 | Bonds | |
| 2002/0094789 | A1 | 7/2002 | Harano | |
| 2002/0123309 | A1 | 9/2002 | Collier et al. | |
| 2003/0062907 | A1 * | 4/2003 | Nevermann | 324/637 |
| 2003/0064732 | A1 | 4/2003 | McDowell et al. | |
| 2003/0064761 | A1 | 4/2003 | Nevermann | |
| 2003/0114127 | A1 * | 6/2003 | Baldwin | 455/245.1 |
| 2003/0186728 | A1 | 10/2003 | Manjo | |
| 2003/0197597 | A1 | 10/2003 | Bahl et al. | |
| 2003/0210203 | A1 | 11/2003 | Phillips et al. | |
| 2003/0218993 | A1 | 11/2003 | Moon et al. | |
| 2004/0167707 | A1 * | 8/2004 | Bragansa et al. | 701/207 |
| 2004/0176083 | A1 | 9/2004 | Shiao et al. | |
| 2004/0222926 | A1 | 11/2004 | Kontogeorgakis et al. | |
| 2004/0229659 | A1 * | 11/2004 | Boos et al. | 455/574 |
| 2005/0124305 | A1 | 6/2005 | Stichelbout | |
| 2005/0157646 | A1 | 7/2005 | Addagatla et al. | |
| 2005/0245204 | A1 | 11/2005 | Vance | |
| 2005/0264304 | A1 | 12/2005 | Nakamura et al. | |
| 2006/0046653 | A1 * | 3/2006 | Kirbas | 455/41.2 |
| 2006/0161871 | A1 | 7/2006 | Hotelling et al. | |
| 2006/0199602 | A1 * | 9/2006 | Zinn | 455/522 |
| 2006/0205368 | A1 | 9/2006 | Bustamante et al. | |
| 2006/0232468 | A1 | 10/2006 | Parker et al. | |
| 2006/0244663 | A1 | 11/2006 | Fleck et al. | |
| 2007/0188375 | A1 | 8/2007 | Richards et al. | |
| 2008/0002626 | A1 | 1/2008 | Yokoyama | |
| 2008/0165063 | A1 | 7/2008 | Schlub et al. | |
| 2008/0220831 | A1 | 9/2008 | Alameh et al. | |
| 2008/0248837 | A1 | 10/2008 | Kunkel | |
| 2009/0000023 | A1 | 1/2009 | Wegelin et al. | |
| 2009/0096683 | A1 | 4/2009 | Rosenblatt et al. | |
| 2009/0174611 | A1 | 7/2009 | Schlub et al. | |
| 2009/0295648 | A1 | 12/2009 | Dorsey et al. | |
| 2009/0305742 | A1 * | 12/2009 | Caballero et al. | 455/566 |
| 2009/0325511 | A1 * | 12/2009 | Kim | 455/84 |
| 2010/0167672 | A1 | 7/2010 | Ahn et al. | |
| 2010/0279686 | A1 * | 11/2010 | Tokgoz et al. | 455/435.1 |
| 2011/0012793 | A1 * | 1/2011 | Amm et al. | 343/702 |
| 2011/0012794 | A1 | 1/2011 | Schlub et al. | |
| 2011/0012840 | A1 * | 1/2011 | Hotelling et al. | 345/173 |
| 2011/0116404 | A1 * | 5/2011 | Shimizu | 370/252 |
| 2011/0159920 | A1 * | 6/2011 | Lehmann | 455/556.1 |
| 2011/0212746 | A1 | 9/2011 | Sarkar et al. | |
| 2011/0250928 | A1 * | 10/2011 | Schlub et al. | 455/550.1 |
| 2011/0313690 | A1 * | 12/2011 | Sato | 702/57 |
| 2012/0021707 | A1 * | 1/2012 | Forrester et al. | 455/103 |
| 2012/0021800 | A1 | 1/2012 | Wilson et al. | |
| 2012/0071195 | A1 | 3/2012 | Chakraborty et al. | |
| 2012/0098588 | A1 * | 4/2012 | Ujvari | 327/517 |
| 2012/0178386 | A1 * | 7/2012 | Pascolini et al. | 455/84 |
| 2012/0208554 | A1 * | 8/2012 | Won et al. | 455/456.1 |
| 2012/0214412 | A1 * | 8/2012 | Schlub et al. | 455/41.1 |
| 2012/0214422 | A1 | 8/2012 | Shi et al. | |
| 2012/0231737 | A1 * | 9/2012 | Ponce De Leon et al. | 455/41.2 |
| 2012/0239955 | A1 * | 9/2012 | Yanase et al. | 713/323 |
| 2012/0257657 | A1 * | 10/2012 | Subrahmanya et al. | 375/222 |
| 2012/0270519 | A1 * | 10/2012 | Ngai et al. | 455/404.1 |
| 2013/0016632 | A1 * | 1/2013 | Mujtaba et al. | 370/275 |
| 2013/0045700 | A1 * | 2/2013 | Stallman et al. | 455/129 |
| 2013/0127670 | A1 * | 5/2013 | Desclos et al. | 343/700 MS |
| 2013/0142054 | A1 * | 6/2013 | Ahmadi | 370/252 |
| 2013/0156080 | A1 * | 6/2013 | Cheng et al. | 375/222 |
| 2013/0169348 | A1 * | 7/2013 | Shi | 327/517 |
| 2013/0210477 | A1 * | 8/2013 | Dieter | 455/522 |
| 2013/0217342 | A1 * | 8/2013 | Abdul-Gaffoor et al. | 455/77 |
| 2014/0024321 | A1 * | 1/2014 | Zhu et al. | 455/77 |
| 2014/0094229 | A1 * | 4/2014 | Mishima et al. | 455/575.5 |
| 2014/0126440 | A1 * | 5/2014 | Frank et al. | 370/311 |
| 2014/0148211 | A1 * | 5/2014 | Mountford et al. | 455/522 |
| 2014/0200003 | A1 * | 7/2014 | Kodali et al. | 455/436 |
| 2015/0011236 | A1 * | 1/2015 | Kazmi et al. | 455/456.1 |

FOREIGN PATENT DOCUMENTS

| | | |
|---|---|---|
| CN | 101053170 | 10/2007 |
| DE | 102005035935 | 2/2007 |
| EP | 0 564 164 | 10/1993 |
| EP | 1298809 | 4/2003 |
| EP | 1 469 550 | 10/2004 |
| EP | 1524774 | 4/2005 |
| EP | 1564896 | 8/2005 |
| EP | 2509229 | 10/2012 |
| GB | 2 380 359 | 4/2003 |
| JP | 2003179670 | 6/2003 |
| JP | 2003209483 | 7/2003 |
| JP | 2003216318 | 7/2003 |
| JP | 2004179995 | 6/2004 |
| JP | 2008009759 | 1/2008 |
| JP | 2008011292 | 1/2008 |
| JP | 2008017432 | 1/2008 |
| JP | 2008050943 | 3/2008 |
| JP | 2009032570 | 2/2009 |
| TW | 201235671 | 9/2012 |
| WO | 0131733 | 5/2001 |

(56) References Cited

FOREIGN PATENT DOCUMENTS

| | | |
|---|---|---|
| WO | 02/05443 | 1/2002 |
| WO | 2005112280 | 11/2005 |
| WO | 2006051363 | 5/2006 |
| WO | 2008078142 | 7/2008 |
| WO | 2009149023 | 12/2009 |
| WO | 2012066559 | 5/2012 |

OTHER PUBLICATIONS

Caballero et al., U.S. Appl. No. 13/886,157, filed May 2, 2013.
"CapTouch Programmable Controller for Single-Electrode Capacitance Sensors", AD7147 Data Sheet Rev. B, [online], Analog Devices, Inc., [retrieved on Dec. 7, 2009], <URL: http://www.analog.com/static/imported-files/data_sheets/AD7147.pdf>.

* cited by examiner

WIRELESS DEVICE WITH DYNAMICALLY ADJUSTED MAXIMUM TRANSMIT POWERS

BACKGROUND

This relates generally to antennas, and, more particularly, to antennas for electronic devices.

Electronic devices such as portable computers and handheld electronic devices are often provided with wireless communications capabilities. For example, electronic devices may use long-range wireless communications circuitry to communicate using cellular telephone bands. Electronic devices may use short-range wireless communications links to handle communications with nearby equipment.

It can be difficult to incorporate wireless functionality into an electronic device. Limits may be imposed by regulatory bodies on the maximum amount of radio-frequency power that can be wirelessly transmitted by a device. These limits pose challenges when operating electronic device antennas at elevated power levels.

It would therefore be desirable to be able to provide electronic devices with improved wireless capabilities.

SUMMARY

An electronic device may be provided with antenna structures. The antenna structures may include one or more antennas for transmitting and receiving wireless signals.

Proximity sensors and other sensors may be used in determining how the electronic device is being operated. There may be, for example, a proximity sensor mounted adjacent to each of multiple antennas in an electronic device or other proximity sensor structures that gather information on which antennas are currently adjacent to external objects. Proximity sensors may be based on capacitive proximity sensors, infrared-light proximity sensors, antenna-based proximity sensors, and other sensor circuitry. Other sensors that may be included in the electronic device include a magnetic sensor that detects whether a cover containing magnets is present on the device, a connector sensor that detects whether the device is coupled to a dock or other accessory that has a connector, and other sensors for evaluating the current operating environment of the electronic device.

Wireless circuitry such as a radio-frequency transmitter associated with a cellular telephone communications band, a wireless local area network band, or other communications band may be used in transmitting radio-frequency signals through the antenna structures. The wireless circuitry may, for example, include a plurality of transmitters each of which transmits radio-frequency signals through an associated antenna at a respective transmit power. Control circuitry may adjust the wireless circuitry to ensure that the transmit powers are capped at appropriate maximum transmit powers.

The maximum transmit power for each antenna may be adjusted dynamically by the control circuitry based on information on the current operating environment for the electronic device and the antennas in the device. Control circuitry may be used, for example, to back off maximum transmit power levels based on data from proximity sensors. If a proximity sensor detects that an external object is adjacent to a given antenna, for example, the control circuitry may back off the maximum transmit power for that antenna by a predetermined amount. The amount by which the maximum transmit power is backed off by the control circuitry may be determined based on proximity sensor data, data from a magnetic sensor, data from a connector sensor, data from a camera, data from a motion sensor, data from other sensors, and data for two or more of these sensors.

Further features of the invention, its nature and various advantages will be more apparent from the accompanying drawings and the following detailed description of the preferred embodiments.

DETAILED DESCRIPTION

Figure 1:
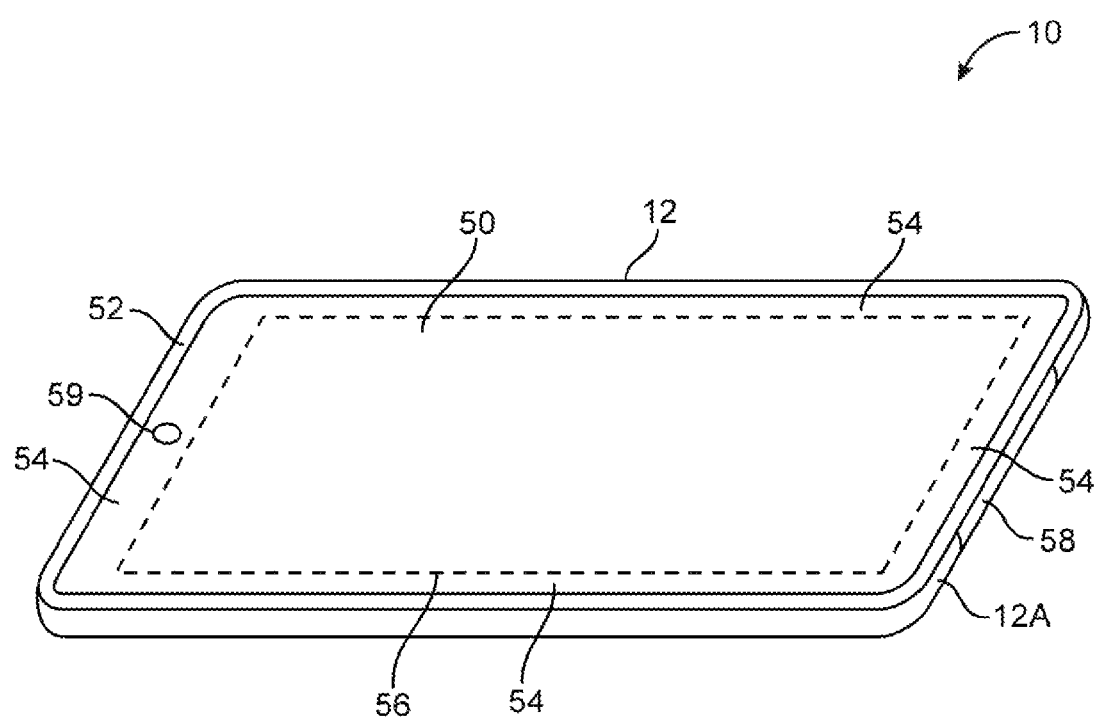
FIG. 1 is a front perspective view of an illustrative electronic device of the type that may be provided with wireless circuitry in accordance with an embodiment of the present invention.

Electronic devices may be provided with wireless communications circuitry. The wireless communications circuitry may be used to support wireless communications in one or more wireless communications bands. For example, the wireless communications circuitry may transmit and receive signals in cellular telephone bands, wireless local area network bands, and other communications bands.

To ensure optimum wireless performance, a wireless electronic device may be provided with radio-frequency transmitters with adjustable output powers. When wireless communications performance is degraded due to link impairment, a large distance between transmitter and receiver, or other factors, the wireless device can compensate by increasing transmit power.

Government regulations limit radio-frequency signal powers for electronic devices. In many jurisdictions, specific absorption rate (SAR) standards impose maximum energy absorption limits on handset manufacturers. These standards place restrictions on the amount of radiation that may be emitted at any particular point within a given distance of an antenna. Particular attention is given to radiation limits at distances of about 1-20 mm from a device, where users are likely to place a body part near an antenna.

Satisfactory antenna performance and regulatory compliance can be ensured by monitoring the environment around the antenna structures in a device in real time. Based on this information, the electronic device can control the transmit power used in transmitting wireless signals through one or more antennas in the device. For example, the electronic device can impose an appropriate maximum transmit power limit for each antenna based on information about the current operating environment for the electronic device and the antennas in the device.

As an example, data from a proximity sensor or other sensors may be used in determining a maximum permissible transmit power. If a proximity sensor detects that an external object such as a user's body is in the vicinity of an antenna or detects other such usage scenarios, transmitted power levels can be reduced. Data from multiple proximity sensors and other types of sensors may be combined to provide an electronic device with satisfactory information on the operating environment for each antenna.

A proximity sensor may be implemented using capacitor electrode structures. The capacitor electrode structures can be used to make capacitance measurements. Changes in the measured capacitance values from the capacitor electrode structures reflect changes in the distance of external objects to the capacitor electrode structures. Other sensors may also be used in generating proximity data and other outputs that can be used by the electronic device in monitoring the operating environment for the electronic device.

Antenna structures may be implemented using patterned conductive traces on a substrate. For example, an antenna resonating element for an antenna may be formed from patterned metal traces on a printed circuit substrate. Antenna structures may also be implemented using portions of an electronic device housing, metal foil, wire, or other conductive structures.

Antenna structures and sensors such as proximity sensors can be formed in electronic devices such as desktop computers, portable computers such as laptop computers and tablet computers, handheld electronic devices such as cellular telephones, etc. With one suitable configuration, which is sometimes described herein as an example, antenna and sensor structures are formed in portable electronic devices. Portable electronic devices that may be provided with antennas and proximity sensors include laptop computers and small portable computers such as ultraportable computers, netbook computers, and tablet computers. Portable electronic devices may also be somewhat smaller devices. Examples of smaller portable electronic devices that may be provided with antennas include cellular telephones, wrist-watch devices, pendant devices, headphone and earpiece devices, and other wearable and miniature devices.

In electronic devices that contain conductive housing structures such as a metal housing walls and internal metal housing structures, the conductive housing structures can serve as all or part of a ground plane. The ground plane may form an antenna ground for one or more antennas in the device. If desired, a ground plane may be formed from conductive structures associated with electronic components (e.g., integrated circuits, sensors, switches, connectors, etc.), conductive traces on printed circuits (e.g., ground plane traces on flexible or rigid printed circuit board), or other conductive structures in an electronic device.

An antenna may be formed from a ground plane (antenna ground) and an antenna resonating element. The antenna resonating element may include structures that form part of a proximity sensor such as a capacitive proximity sensor. The antenna can be fed using a positive antenna feed terminal that is coupled to the antenna resonating element and using a ground antenna feed terminal that is coupled to the ground plane (e.g., a conductive housing). During operation, radio-frequency signals for the antenna can pass through an antenna window, a portion of a display cover glass, a plastic housing or other dielectric housing, or other radio-transparent structures. Capacitive proximity sensor structures such as electrodes formed from parts of an antenna or other electrodes may be coupled to proximity sensor processing circuitry that uses capacitance measurements to detect the presence of external objects.

Control circuitry in an electronic device may be used to control the power of transmitted radio-frequency signals during operation of the electronic device. If desired, limits may be placed on the maximum amount of transmitted power from each antenna and associated transmitter. During operation, transmit power levels can be increased or decreased based on link quality measurements, based on commands received from a network, or based on other criteria. The maximum transmit power limit for an antenna in a device may be used to ensure that the amount of transmitted power satisfies regulatory restrictions. In situations in which it is determined that an external object such as part of a human body is in proximity of an antenna or is likely to be present, the maximum transmit power that is in effect for the antenna may be temporarily lowered.

An illustrative portable device that may include one or more antennas and sensor structures is shown in FIG. 1. As shown in FIG. 1, device 10 may be a relatively thin device such as a tablet computer. Device 10 may have display such as display 50 mounted on its front (top) surface. Housing 12 may have curved portions that form the edges of device 10 and a relatively planar portion that forms the rear surface of device 10 (as an example). Housing 12 may be a dielectric housing such as a plastic housing through which radio-frequency signals for an antenna pass or housing 12 may be formed from conductive structures such as metal in which dielectric antenna window structures such as antenna window 58 are formed. Antennas structures, capacitive proximity sensor structures, structures that use electromagnetic signals, and other sensors and structures may be mounted under windows such as window 58 of FIG. 1.

Device 10 may have user input-output devices such as button 59. Display 50 may be a touch screen display that is used in gathering user touch input. The surface of display 50 may be covered using a dielectric member such as a planar display cover layer formed from a layer of transparent glass or plastic. The central portion of display 50 (shown as region 56 in FIG. 1) may be an active region that is sensitive to touch input and that contains and array of display pixels that present images to a user. The peripheral regions of display 50 such as regions 54 may be inactive regions that are free from touch sensor electrodes and that are free from display pixels.

A layer of opaque masking material such as an opaque ink may be placed on the underside of display 50 in peripheral regions 54 (e.g., on the underside of the display cover layer). This layer may be transparent to radio-frequency signals. The conductive components in region 56 may tend to block radio-frequency signals. However, radio-frequency signals may pass through the display cover layer and opaque masking layer in inactive display regions 54 (as an example). Radio-frequency antenna signals may also pass through antenna window 58. Lower-frequency electromagnetic fields such as signals associated with making proximity sensor capacitance measurements may pass through the display cover layer in region 54 and/or window 58 (as examples).

Housing 12 may be formed from one or more structures. For example, housing 12 may include an internal frame and planar housing walls that are mounted to the frame. Housing 12 may also be formed from a unitary block of material such as a cast or machined block of aluminum. Arrangements that use both of these approaches may also be used if desired.

Housing 12 may be formed of any suitable materials including plastic, wood, glass, ceramics, metal, fiber-based composites such as carbon fiber composites, other suitable materials, or a combination of these materials. In some situations, portions of housing 12 may be formed from a dielectric or other low-conductivity material, so as not to disturb the operation of conductive antenna elements that are located in proximity to housing 12. In other situations, housing 12 may be formed from metal elements.

With one suitable arrangement, housing 12 may be formed from a metal such as aluminum. Portions of housing 12 in the vicinity of antenna window 58 may be used as antenna ground. Antenna window 58 may be formed from a dielectric material such as polycarbonate (PC), acrylonitrile butadiene styrene (ABS), a PC/ABS blend, or other plastics (as examples). Window 58 may be attached to housing 12 using adhesive, fasteners, or other suitable attachment mechanisms. To ensure that device 10 has an attractive appearance, it may be desirable to form window 58 so that the exterior surfaces of window 58 conform to the edge profile exhibited by housing 12 in other portions of device 10. For example, if housing 12 has straight edges 12A and a flat bottom surface, window 58 may be formed with a right-angle bend and vertical sidewalls. If housing 12 has curved edges 12A, window 58 may have a similarly curved surface. There may be any suitable number of antenna windows in device 10 such as antenna window 58 of FIG. 1 (e.g., one or more antenna windows 58, two or more antenna windows 58, three or more antenna windows 58, or four or more antenna windows 58). Antenna windows may be located on any suitable portions of device 10 (e.g., on the top, sides, rear surface, etc.).

Figure 2:
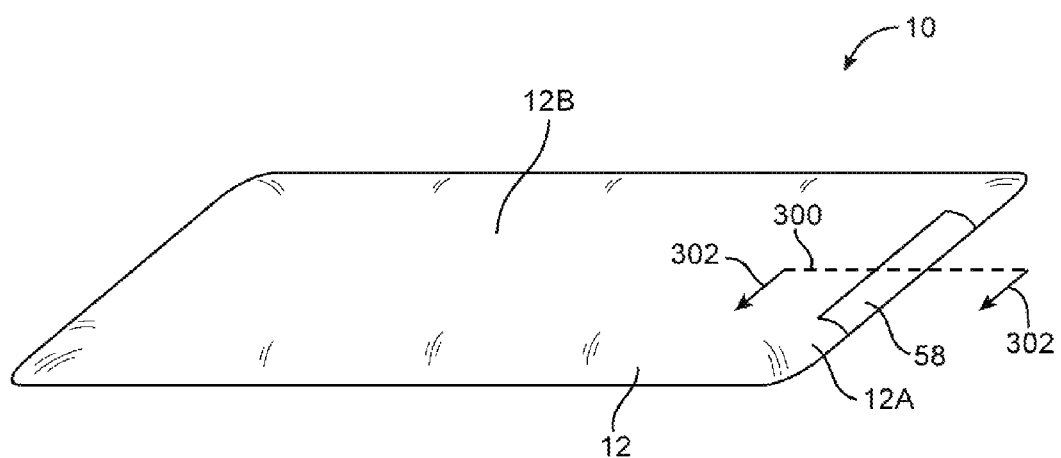
FIG. 2 is a rear perspective view of an illustrative electronic device such as the electronic device of FIG. 1 in accordance with an embodiment of the present invention.

FIG. 2 is a rear perspective view of device 10 of FIG. 1 showing how device 10 may have a relatively planar rear surface 12B and showing how antenna window 58 may be rectangular in shape with curved portions that match the shape of curved housing edges 12A.

Figure 3:
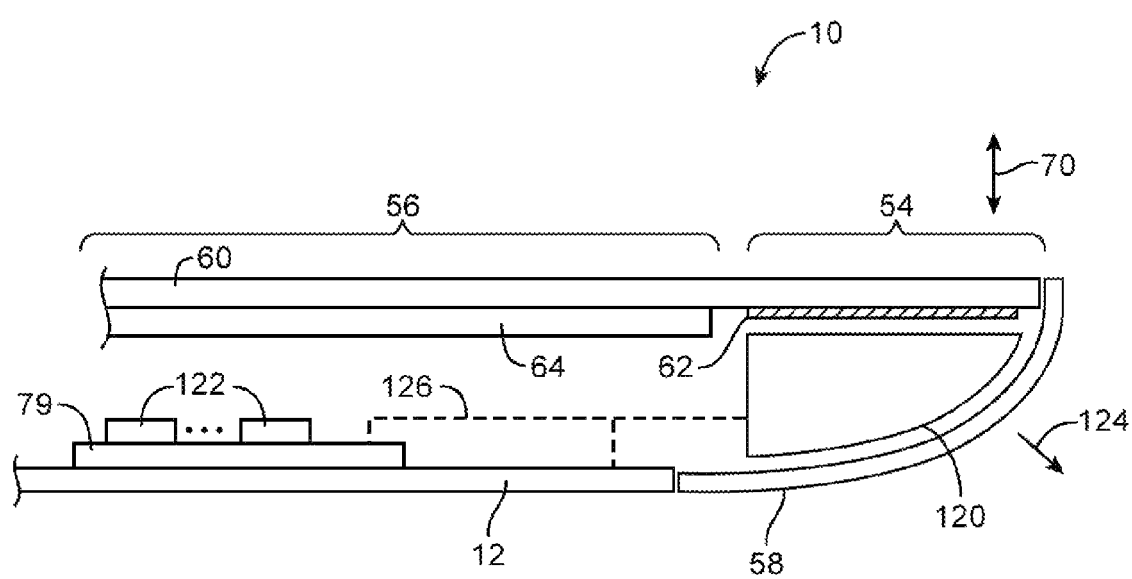
FIG. 3 is a cross-sectional side view of a portion of the electronic device of FIGS. 1 and 2 in accordance with an embodiment of the present invention.

A cross-sectional view of device 10 taken along line 300 of FIG. 2 and viewed in direction 302 is shown in FIG. 3. As shown in FIG. 3, structures 120 may be mounted within device 10 in alignment with antenna window 58 and inactive region 54 of the display for device 10. Structures 120 may include antenna structures and, if desired, proximity sensor structures. For example, structures 120 may include conductive structures that serve as an antenna resonating element for an antenna. The antenna may be fed using transmission line 126. Transmission line 126 may have a positive signal conductor that is coupled to a positive antenna feed terminal on the antenna resonating element in structures 120 and a ground signal conductor that is coupled to antenna ground (e.g., housing 12 and/or other conductive structures). There may be any suitable number of antennas and antenna windows 58 in device 10 (e.g., one or more, two or more, three or more, four or more, etc.). Each antenna window may be associated with one or more antennas.

An antenna resonating element formed from structures 120 may be based on any suitable antenna resonating element design (e.g., structures 120 may form a patch antenna resonating element, a single arm inverted-F antenna structure, a dual-arm inverted-F antenna structure, other suitable multi-arm or single arm inverted-F antenna structures, a closed and/or open slot antenna structure, a loop antenna structure, a monopole, a dipole, a planar inverted-F antenna structure, a hybrid of any two or more of these designs, etc.). Housing 12 may serve as antenna ground or other conductive structures within device 10 may serve as antenna ground (e.g., conductive components, traces on printed circuits, etc.).

If desired, conductive structures within structures 120 may, if desired, form one or more proximity sensor capacitor electrodes. These conductive structures may form parasitic antenna resonating elements, portions of an inverted-F antenna resonating element or other types of antenna resonating elements, metal traces on a dielectric substrate, or structures.

During operation of the antenna formed from structures 120, radio-frequency antenna signals can be conveyed through dielectric window 58. Radio-frequency antenna signals associated with structures 120 may also be conveyed through a display cover member such as cover glass 60. Display 50 may have an active region such as region 56 in which cover glass 60 has underlying conductive structure such as display module 64. The structures in display module 64 such as touch sensor electrodes and active display pixel circuitry may be conductive and may therefore attenuate radio-frequency signals. In region 54, however, display 50 may be inactive (i.e., panel 64 may be absent). An opaque masking layer such as opaque masking layer 62 may be formed on the underside of transparent cover glass 60 in region 54 to block the antenna resonating element from view. Opaque masking layer 62 and the dielectric material of display cover layer 60 in region 54 may be sufficiently transparent to radio-frequency signals that radio-frequency signals can be conveyed through these structures in directions 70.

As shown in FIG. 3, device 10 may have electrical components 122. Components 122 may include integrated circuits, radio-frequency transceiver circuitry and other wireless circuitry, control circuitry, discrete components such as capacitors, resistors, and inductors, connectors, and other electrical components. Components 122 may be mounted on one or more substrates such as substrate 79. Substrates such as substrate 79 of FIG. 3 may include printed circuits such as rigid printed circuit boards (e.g., printed circuits boards formed from fiberglass-filled epoxy or other rigid printed circuit board substrate material) and flexible printed circuits (e.g., printed circuits formed from sheets of flexible printed circuit material such as layers of polyimide).

Figure 4:
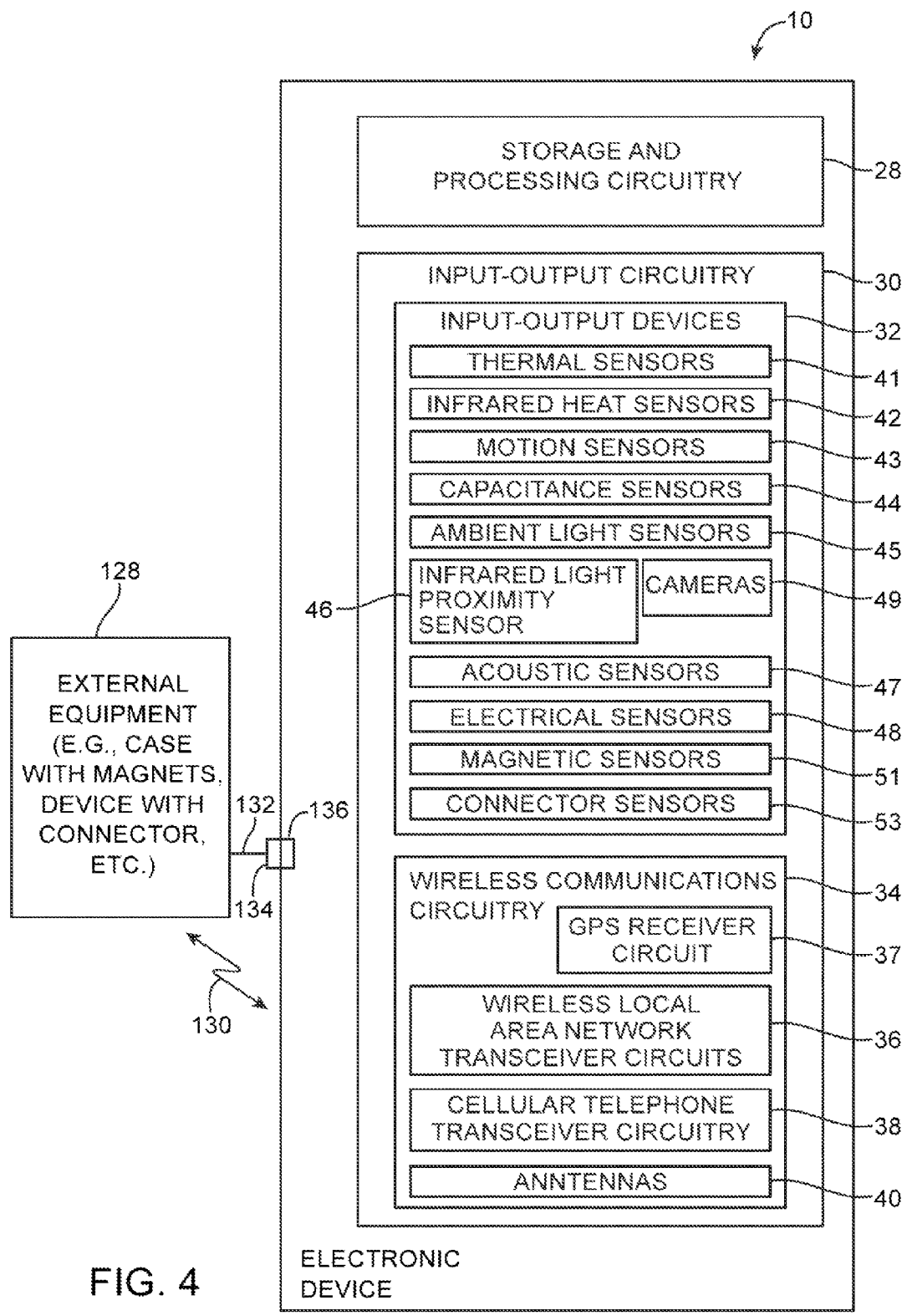
FIG. 4 is a schematic diagram of an illustrative system that includes external equipment and an electronic device in accordance with an embodiment of the present invention.

A schematic diagram of an illustrative electronic device is shown in FIG. 4. Device 10 of FIG. 4 may be a portable computer such as a portable tablet computer, a mobile telephone, a mobile telephone with media player capabilities, a handheld computer, a remote control, a game player, a global positioning system (GPS) device, a wrist-watch device, a combination of such devices, or any other suitable electronic device.

As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 30 may be used to allow data to be supplied to device 10 and to allow data to be provided from device 10 to external devices. Input-output circuitry 30 may include input-output devices 32 such as touch screens (e.g., display 50), buttons (e.g., button 59), joysticks, click wheels, scrolling wheels, touch pads, key pads, keyboards, microphones, cameras, etc. A user can control the operation of device 10 by supplying commands through such user input devices. Display and audio devices such as display 50 (FIG. 1) and other components that present visual information and status data may be included in devices 32. Display and audio components in input-output devices 32 may also include audio equipment such as speakers and other devices for creating sound. If desired, input-output devices 32 may contain audio-video interface equipment such as jacks and other connectors.

Input-output devices 32 may include sensors. Data from sensors may be used to control the operation of device 10. For example, data from sensors in device 10 may be used to control screen brightness, the orientation of information on screen 14, the operation of wireless circuitry, the power at which wireless circuitry transmits radio-frequency signals, etc.

The sensors in device 10 may include thermal sensors 41. Thermal sensors 41 may be used to detect where and when a user is touching device 10. For example, thermal sensors 41 may be used to monitor when a user is holding device 10 in the user's hand or may be used to monitor when device 10 is resting on the user's lap. Multiple thermal sensors 41 may be provided to determine where a user's body is contacting device 10. There may be, for example, a thermal sensor associated with each of multiple antennas in device 10. If a temperature rise is measured near one of the antennas, the power of that antenna may be reduced or other appropriate action may be taken. Sensors 41 may be implemented using thermocouples, bimetallic temperature sensors, solid state devices, or other suitable temperature sensors.

The sensors in device 10 may also include infrared heat sensors 42. Heat sensors 42 may measure heat using thermal imaging techniques (i.e., by detecting the emitted infrared light from an object that is characteristic of the object's heat). If desired, Peltier effect coolers, heat sinks, or other devices may be used to cool infrared heat sensors 42 to reduce noise. As with thermal sensors 41, infrared heat sensors 42 may be used to detect whether a user is touching device 10. Infrared heat sensors 42 may, for example, be used to detect when a user is holding device 10 or is resting device 10 on the user's lap. More than one infrared heat sensor 42 may be provided. This allows device 10 to determine where an external object such as a part of a user's body is contacting device 10. Each of the antennas in device 10 may be provided with a respective infrared heat sensor 42. Appropriate action may be taken when heat is detected adjacent to a particular antenna. For example, the antenna may be temporarily inactivated. Infrared heat sensors 42 may be implemented using semiconductor devices or other suitable infrared heat sensor equipment. Heat sensors 42 may operate in the near-infrared band (i.e., 700 nm to 1400 nm), or may operate at longer wavelengths such as those in the short-wavelength, mid-wavelength, or long-wavelength infrared bands.

Motion sensors 43, which may sometimes be referred to as accelerometers, may be used to detect the earth's gravity and the relative motion of device 10. Motion sensors 43 may therefore be used to determine how device 10 is oriented and whether device 10 is exhibiting movement characteristic of human use. For example, one or more motion sensors 43 may be used in determining whether display 14 lies in a plane parallel to the plane of the earth's surface (as when device 10 is resting flat on a table and is not adjacent to a user's body) or at a non-zero angle relative to the plane of the earth's surface. Sensors 43 can also determine whether device 10 is oriented in a landscape orientation or a portrait orientation. Movement such as periodic transitions between landscape and portrait mode or jiggling motions may be indicative of human use and can be detected using sensors 43.

Capacitance sensors 44 may be integrated into a touch screen such as display 50 or may be provided as stand-alone devices. Capacitance sensors 44, which may sometimes be referred to as touch sensors, may be used to determine when an external object such as a portion of a user's body has come into direct contact with device 10 or has come within a given threshold distance of device 10 (e.g., within 5 mm). Data gathered with capacitance sensors 44 may be used to generate proximity data (i.e., data on the proximity of external objects to device 10 and the antennas in device 10), so sensors 44 may sometimes be referred to as proximity sensors or capacitive proximity sensors.

Ambient light sensors 45 may be used to measure the amount of light that is illuminating device 10. Ambient light sensors 45 may be sensitive in the visible spectrum and/or may be sensitive to infrared light. Sensors 45 may be used to determine when a user's body is adjacent to particular portions of device 10. For example, an ambient light sensor may be mounted on the front face of device 10 to detect when a user has placed device 10 in the vicinity of the user's head (and has thereby blocked light from reaching the ambient light sensor). Infrared light proximity sensor 46 may similarly use a light detector to determine whether an external object is in the vicinity of device 10. Infrared light proximity sensor 46 may include an active emitter such as an infrared light emitting diode. The diode may be modulated to improve the signal-to-noise ratio of the sensor. When light from the diode is reflected back into an infrared light sensor in the infrared light proximity sensor 46, the sensor can generate an output signal indicating that an object is in the vicinity of sensor 46.

Acoustic sensors 47 may include microphones. The microphone may gather ambient noise readings that are indicative of whether device 10 is being used by a user. For example, a microphone in an acoustic sensor may be used to detect the amount of ambient noise that is present in the vicinity of device 10. If ambient noise or certain types of ambient noise (e.g., voices) are present, device 10 can conclude that device 10 is being used by a user. Acoustic sensors 47 may also include acoustic emitters (e.g., ultrasonic transducers). This type of acoustic sensor may use echolocation techniques to measure the distance between device 10 and surrounding objects and may therefore serve as an acoustic proximity sensor.

Electrical sensors 48 may be used to make electrical measurements. Electrical sensors 48 may include, for example, current sensors, resistance sensors, voltage sensors, etc. Electrodes that are formed as part of electrical sensors 48 or that are electrically connected to sensors 48 may be used in making electrical measurements. As an example, a pair of electrical terminals may be located on portions of housing 12. An electrical sensor may measure the resistance between the electrical terminals. When a user holds device 10 in the user's hand, the electrical sensor may detect a drop in resistance that is indicative of the presence of the user's hand.

If desired, input-output circuitry 30 may include cameras such as cameras 49. Cameras 49 may have image sensor integrated circuits that include two-dimensional arrays of light-sensitive pixels. Image sensors in cameras 49 may have sufficient resolution for forming photographs or may have lower resolution (e.g., for gathering proximity data or other data on the environment of device 10). The image sensors in cameras 49 may be sensitive in the visible spectrum, in the infrared spectrum, etc. Image data that is acquired by cameras 49 may include still images and moving images (video clips). This information may be processed by a general purpose processor, a dedicated image processing circuit, or other circuitry in storage and processing circuitry 28.

Cameras 49 may gather information that is used in determining whether or not a user's body or other external objects are in the vicinity of device 10. Examples of acquired image data that may indicate that a user's body or other external object is in the vicinity of device 10 and antennas in device 10 include images containing a user's face or other identifiable body part, images containing motion, images containing flesh tones, hair, or other human attributes, image data such as video data indicating motion towards the antennas of device 10 or other portion of device 10, dark (black) images and other images in which a camera sensor (i.e., a camera window and camera module lens) in device 10 has been obscured and therefore blocked by a human body part, a table on which device 10 is resting, or other external object, etc. This information may be combined with other sensor data to enhance human body detection accuracy.

Device 10 may include one or more magnetic sensors such as magnetic sensors 51. Magnetic sensors 51 may be, for example, Hall effect sensors. Sensors 51 may measure the magnetic field produced by external structures such as external equipment 128. External equipment 128 may be an accessory such as a cover for device 10 that includes embedded magnets. Sensors 51 may monitor magnetic field strength in device 10 to determine whether or not the cover is present. When no magnetic field is detected, device 10 can conclude that the cover is not present. When sensors 51 detect the presence of a magnetic field, device 10 can conclude that the cover is present. Because the cover may affect the output of other sensors in device 10 such as proximity sensors, the use of magnetic sensor structures 51 may help device 10 to discriminate between situations in which an antenna is blocked by an external object such as a human body part (in which case maximum wireless transmit power levels should be reduced) and situations in which the cover is being detected by a proximity sensor (in which case fewer or no reductions in maximum wireless transmit powers should be made).

External equipment 128 may be a cover, a pair of headphones, a docking station such as a dock associated with a computer, a dock in electronic equipment such as a radio or speakers, a cable that couples device 10 to a computer, or other external equipment. External equipment 128 may communicate wirelessly with device 10, as shown by wireless communications signals 130. External equipment 128 may also be coupled to device 10 using a wired path such as cable 132 or a wired path that is mounted inside a dock or other housing. Cable 132 may be a digital cable, an analog cable, a cable that contains wires that convey digital and/or analog signals, or other suitable communications path. Cable 132 may have a connector such as connector 134 that is plugged into connector 136 in device 10. Connector sensors such as connector sensors 53 may be used in monitoring the status of connector ports such as connector port 136. Connector sensors 53 may, for example, include momentary switches and other structures that can detect situations in which no connectors 134 have been plugged into port 136 and that can detect situations in which a connector 134 has been plugged into port 136.

Sensors such as sensors 41, 42, 43, 44, 45, 46, 47, 48, 49, 51, and 53 are merely illustrative. Other sensors may be used to gather data on the environment and operation of device 10 if desired. These sensors may serve as proximity sensors, may serve as sensors that help determine the operating state of device 10 (i.e., whether or not a user is actively using device 10 and is therefore in the vicinity of device 10 and the antennas of device 10), may produce data that is used in conjunction with proximity sensor data to enhance the accuracy of the proximity sensor data, may produce information about the presence or absence of connectors such as connector 134 (i.e., whether or not connectors such as connector 134 have been mated with corresponding connectors such as connector 136 or other input-output devices 32). The sensors can be provided as single stand-alone units, as groups of multiple stand-alone units, in combined structures in which the functionality of multiple sensors are combined into a single unit, etc. Each antenna may have a respective sensor (e.g., a respective proximity sensor) or proximity sensors may be shared between multiple antennas. Proximity sensors that are shared between multiple antennas may, if desired, provide proximity sensor output that is indicative of which of the antennas (or both) are in the vicinity of an external object.

Wireless communications circuitry 34 may be used by device 10 to communicate with external equipment such as cellular telephone networks, wireless local area networks, peer devices, near field communications equipment, or other external equipment (see, e.g., external equipment 128).

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include radio-frequency transceiver circuits for handling multiple radio-frequency communications bands. For example, circuitry 34 may include transceiver circuitry 36 and 38. Transceiver circuitry 36 may be wireless local area network circuitry that handles 2.4 GHz and 5 GHz bands for WiFi® (IEEE 802.11) communications and optional 2.4 GHz Bluetooth® communications. Circuitry 34 may use cellular telephone transceiver circuitry 38 for handling wireless communications in cellular telephone bands in the frequency range of 700 MHz to 2700 MHz (as an example). Circuitry 38 may handle voice data and non-voice data.

Wireless communications circuitry 34 can include circuitry for other short-range and long-range wireless links if desired. For example, wireless communications circuitry 34 may include satellite navigation system circuitry such as global positioning system (GPS) receiver circuitry 37 for receiving GPS signals at 1575 MHz or for handling other satellite positioning data, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

In addition to or instead of using a thermal proximity sensor, infrared heat proximity sensor, capacitance proximity sensor, or infrared-light proximity sensor, device 10 may gather information on whether or not external objects are in the vicinity of device 10 using an antenna-based proximity sensor.

Figure 5:
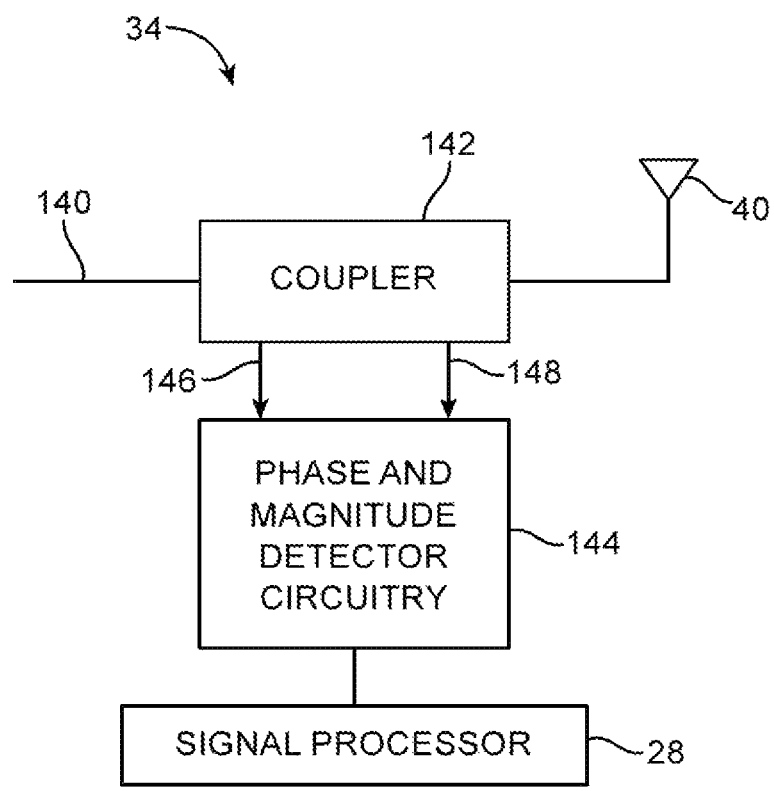
FIG. 5 is a circuit diagram showing illustrative circuitry that may be used to measure radio-frequency antenna signals in real time to generate antenna-based proximity sensor data during operation of an electronic device in accordance with an embodiment of the present invention.

Illustrative wireless circuitry 34 that may be used in implementing an antenna-based proximity sensor of this type is shown in FIG. 5. As shown in FIG. 5, wireless circuitry 34 may receive transmitted radio-frequency antenna signals on path 140 (e.g., from power amplifier circuitry coupled to the output of a radio-frequency transceiver such as transceiver 36 or transceiver 38). Coupler 142 may route the transmitted radio-frequency antenna signals to antenna 40, so that these signals are transmitted over the air to a remote receiver.

Coupler 142 may also serve as a tap that routes a fraction of the transmitted signals from path 140 to phase and magnitude detector circuitry 144 over path 146. Radio-frequency antenna signals that are received by coupler 142 from antenna 40 (e.g., transmitted signals that have reflected from antenna 40) may be routed to phase and magnitude detector circuitry 144 on path 148. Radio-frequency signal phase and magnitude detector circuitry 144 may monitor the values of the signals on paths 146 and 148 and may generate corresponding measured phase and magnitude information that is passed to a signal processor or other control circuitry 28. Circuitry such as circuitry 144 and 28 may be implemented using dedicated hardware, one or more general purpose processors, digital signal processing circuitry, or other suitable control circuitry (e.g., storage and processing circuitry 28 of FIG. 1).

The circuitry of FIG. 5 may be used to monitor one, two, more than two, or all of the antennas 40 in device 10. Real-time antenna impedance measurements gathered using the circuitry of FIG. 5 may be analyzed by control circuitry 28. Using antenna signal monitoring circuitry such as circuitry 34 of FIG. 5, the behavior of each of antennas 40 and therefore information on the environment in which each of antennas 40 is operating may be measured in real time.

When an external object such as a human body part is brought into proximity with antenna 40, the external object will tend to load the antenna. The impedance of antenna 40 that is measured using the circuitry of FIG. 5 will therefore change. This effect allows the real-time antenna impedance information gathered using the circuitry of FIG. 5 to be used as antenna-based proximity sensor data (i.e., the circuitry of FIG. 5 may be used to serve as one or more proximity sensors that are sensitive to the presence of external objects in the vicinity of each of antennas 40). Whenever the measurements of the antenna-based proximity sensor circuitry of FIG. 5 and the information of other sensors in device 10 indicate that a user's body or other external object is in the vicinity of device 10 or a particular antenna 40 in device 10 (i.e., closer than a threshold distance), device 10 may take appropriate actions.

Figure 6:
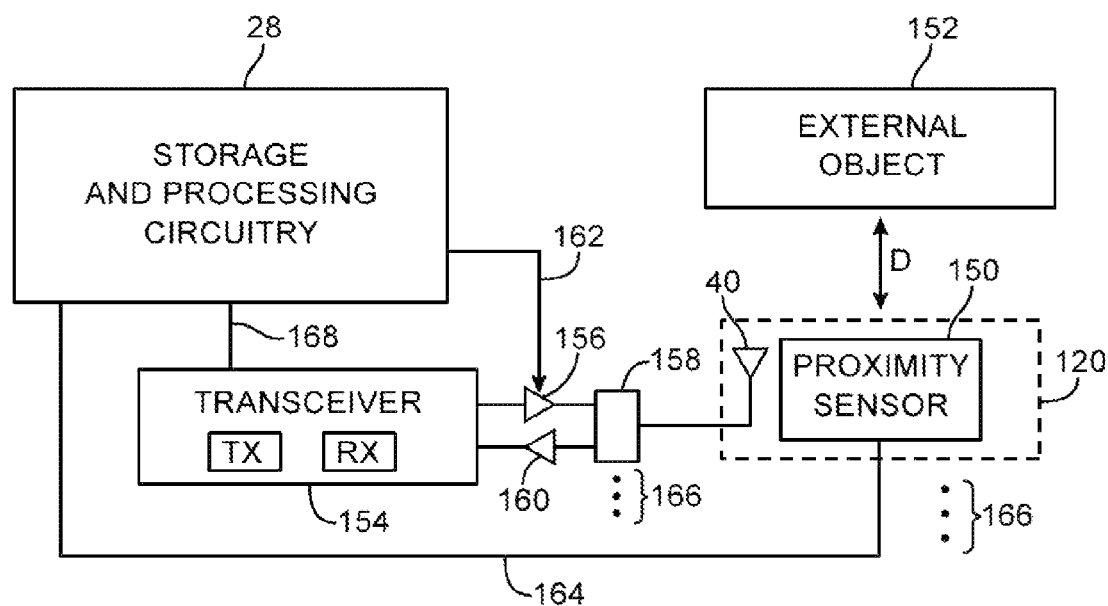
FIG. 6 is a circuit diagram of radio-frequency communications circuitry and proximity sensor circuitry that may be used in an electronic device such as the electronic device of FIG. 1 in accordance with an embodiment of the present invention.

As illustrated in the circuit diagram of FIG. 6, structures 120 may include antenna structures such as antenna 40 and proximity sensor structures such as proximity sensor 150. Proximity sensor 150 may be a capacitive proximity sensor having capacitor electrodes (see, e.g., capacitance sensor 44 of FIG. 4). The capacitor electrode structures of proximity sensor 150 may form parts of a parasitic antenna resonating element for antenna 40, may form parts of an antenna resonating element for antenna 40, or may be separate from antenna 40 while being sufficiently close to the structures of antenna 40 to allow proximity sensor readings to reflect whether or not external objects are present in the vicinity of antenna 40. Proximity sensor 150 may, if desired, be formed using antenna-based proximity sensor circuitry of FIG. 5, thermal sensor 41 (FIG. 4), infrared heat sensor 42, infrared-light proximity sensor 46, and/or other proximity sensor structures in input-output devices 32 of FIG. 4. There may be one proximity sensor 150 for each antenna in device 10 or one or more proximity sensors may be shared by multiple antennas.

Storage and processing circuitry 28 may provide data to be transmitted to transceiver circuitry 154 (see, e.g., transceivers 36 and 38 of FIG. 4). Transceiver circuitry 154 contains a transmitter (TX) that produces radio-frequency output signals to be transmitted wirelessly using antenna 40. Power amplifier 156 amplifies the radio-frequency signals that are supplied by the transmitter circuitry of transceiver circuitry 154 and provides correspondingly strengthened versions of these output signals to antenna 40 via coupler 158 (e.g., a duplexer). Incoming antenna signals that have been received by antenna 40 are routed to low noise amplifier 160 by duplexer 158. Receiver circuitry in transceiver circuitry 154 such as receiver RX receives the incoming radio-frequency signals that have been received by antenna 40 and amplified by low-noise amplifier 160. Signal strength measurements may be made on the received signals (e.g., using circuitry 28). As indicated by dots 166, there may be multiple antennas 40, multiple corresponding proximity sensors 150, and multiple blocks of transceiver circuitry 154 in device 10. Configurations in which a single proximity sensor provides proximity sensor information on whether external objects are located adjacent to multiple antennas may also be used, if desired.

Proximity measurements made using proximity sensor 150 may be used in controlling the power of the antenna signals that are transmitted by device 10 through each antenna 40. Proximity sensor signals may be conveyed to storage and processing circuitry 28 from structures 120 using path 164. The proximity sensor signals from proximity sensor 150 may be processed using a capacitance-to-digital converter and/or other sensor signal processing circuits in circuitry 28 to produce analog and/or digital proximity data. The proximity data may, for example, be Boolean data indicating that external object 152 (e.g., a human body part or other external structure) is or is not within a given predetermined distance of structures 150, antenna 40, and sensor 150 or may be continuous data representing a current distance value for D.

Storage and processing circuitry 28 may be coupled to wireless circuitry such as transceiver circuitry 154 and power amplifier circuitry 156. During data transmission operations, path 168 may be used to convey data from storage and processing circuitry 28 to transceiver 154. Path 168 may also be used to convey control signals to transceiver 154 and transmitter TX in transceiver 154 that control the output power of the transmitted signals from transmitter TX and transceiver 154. Path 162 may be used to convey control signals from storage and processing circuitry 28 to power amplifier circuitry 156. The control signals provided to transceiver 154 and power amplifier 156 may be used to adjust output powers for the wireless signals produced by the wireless circuitry of FIG. 6 in real time. For example, when data is being transmitted, transceiver 154 and associated output amplifier 156 can be directed to increase or decrease the power level of the radio-frequency signals that are being provided to antenna 40 to ensure that a satisfactory wireless link is maintained. In making these adjustments, the transmit power that is used can be capped at a maximum allowable transmit power level to ensure that regulatory limits for electromagnetic radiation emission are satisfied.

Figure 7:
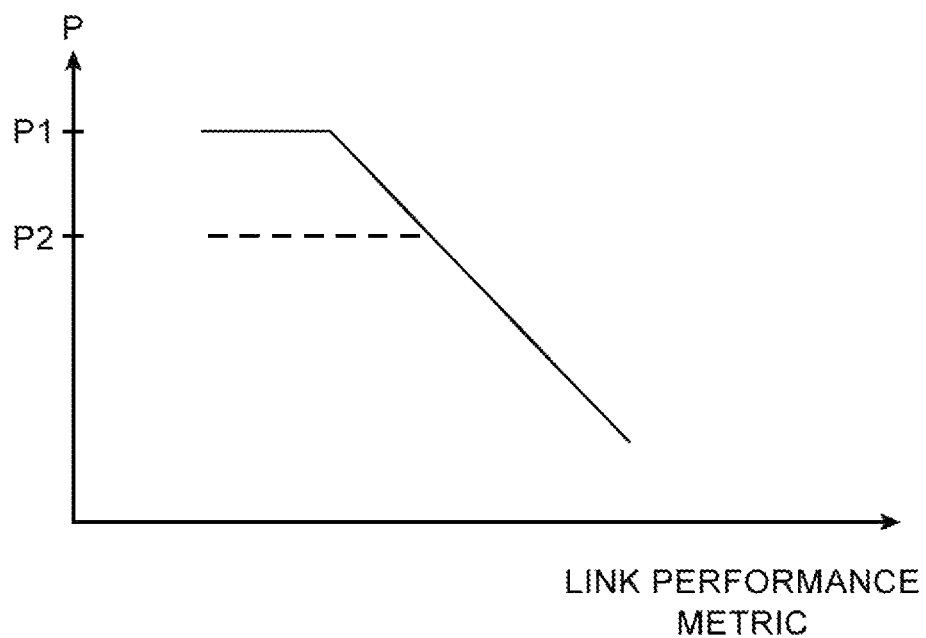
FIG. 7 is a graph in which wireless transmit power in an electronic device has been plotted as a function of a link performance metric for two illustrative maximum transmit power settings in accordance with an embodiment of the present invention.

The graph of FIG. 7 shows how control circuitry such as storage and processing circuitry 28 of FIG. 6 may adjust output power P of power amplifier 156 based on data such as a wireless link performance metric. When wireless link performance is relatively high, the power P of the wireless antenna signals that are transmitted may be relatively low to conserve power. As link performance degrades due to increasing distance between device 10 and a cellular base station, wireless local area network base station, or other equipment with which device 10 is wirelessly communicating or as link performance degrades due to other link impairments, device 10 may increase the transmitted power level P to compensate. Device 10 may increase power transmission based on locally measured data such as received signal strength data gathered using a baseband processor integrated circuit or other control circuitry 28 or may increase power transmission in response to receipt of commands from an external wireless base station (e.g., transmit power control commands from a cellular telephone base station that direct device 10 to increase transmit power to ensure satisfactory received signal strength at the base station).

To prevent excess power transmission (i.e., power transmission that would exceed regulatory limits), control circuitry 28 may impose a maximum permissible transmit power level on the wireless circuitry. During operation, control circuitry 28 can adjust the power amplifier and other wireless circuitry of device 10 to ensure that the transmit power is capped at the maximum transmit power level.

In particular, control circuitry 28 may impose a maximum transmit power such as maximum transmit power P1 in the graph of FIG. 7. When link performance becomes degraded sufficiently, control circuitry 28 will attempt to transmit signals using transmitter TX and power amplifier 156 that, if not limited, would exceed maximum transmit power P1. By imposing maximum transmit power P1, control circuitry 28 can limit the amount of transmitted power P to P1. In this situation, even if the link performance metric being used by control circuitry 28 to adjust output power (e.g., received signal strength, received transmit power commands, etc.) decreases by an additional amount, the amount of transmitted power will remain capped at the maximum value of P1, as shown in FIG. 7.

In situations in which device 10 determines that an external object 152 such as a part of the user's body is in the vicinity of antenna 40, control circuitry 28 can reduce the maximum permissible transmit power from its maximum possible value P1 to a reduced level such as level P2 of FIG. 7 that is appropriate for operation when the user's body is present, thereby ensuring that specific absorption rate standards are satisfied. When link quality is high, output power may be increased or decreased as needed based on received signal strength measurements or other link quality data or based on received transmit power commands (as examples). When link quality is low, transmit power level P may be increased up to maximum power level P2.

In the example of FIG. 7, there are two permissible maximum transmit power levels P1 and P2. Maximum transmit power P1 corresponds to a situation in which control circuitry 28 has not backed off the maximum transmit power (i.e., the backoff power level is zero) and maximum transmit power P2 corresponds to a situation in which control circuitry 28 has backed off the maximum transmit power by a backoff amount equal to P1-P2. This is merely illustrative. There may be three different maximum transmit power levels (P1, P2, and P3) with three corresponding maximum transmit power backoff levels, there may be four or more different maximum transmit power levels, there may be a continuously variable adjustable maximum transmit power level, or other maximum transmit power level schemes may be used. Moreover, one or more sources of sensor data may be used in adjusting output power and maximum power, two or more different sources of sensor data may be used, three or more different sources of sensor data may be used, etc. Examples of information that may be used in increasing and decreasing transmit power P in real time and/or that may be used in dynamically selecting an appropriate maximum transmit power include proximity sensor data from one or more of the proximity sensors in device 10, information from connector sensor 53, information from magnetic sensor 51, and information from other sensors in input-output devices 32 of FIG. 4.

Figure 8:
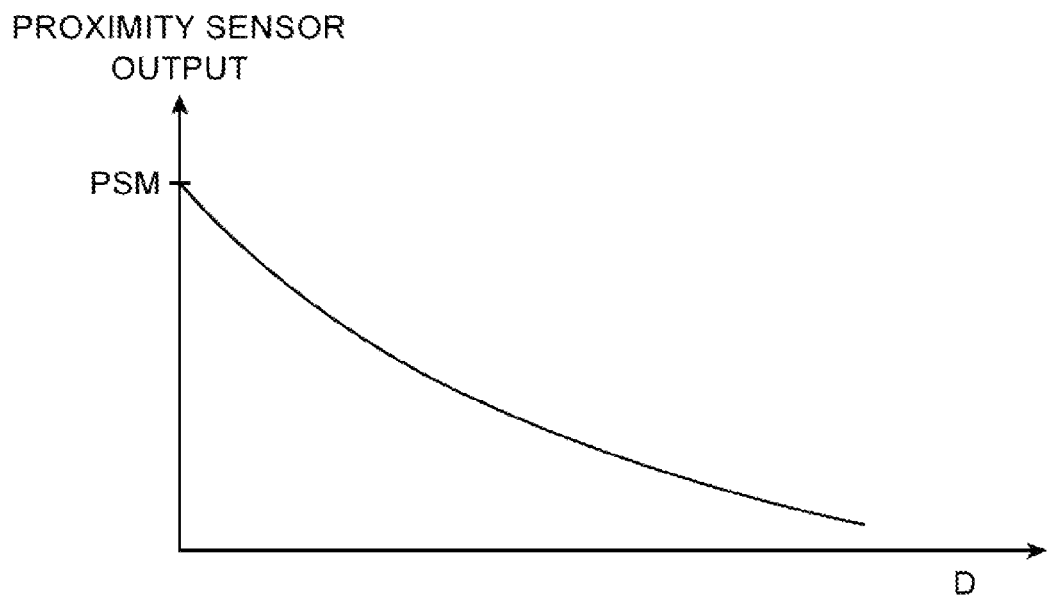
FIG. 8 is a graph in which proximity sensor output has been plotted as a function of the separation between an external object and a proximity sensor in accordance with the present invention.

FIG. 8 is a graph showing how proximity sensor output may vary as a function of distance D between proximity sensor 150 and external object 152 (FIG. 6). The maximum amount of proximity sensor output signal is PSM in the FIG. 8 example (corresponding to a situation in which an external object is held directly against the proximity sensor, as an example).

Figure 9:
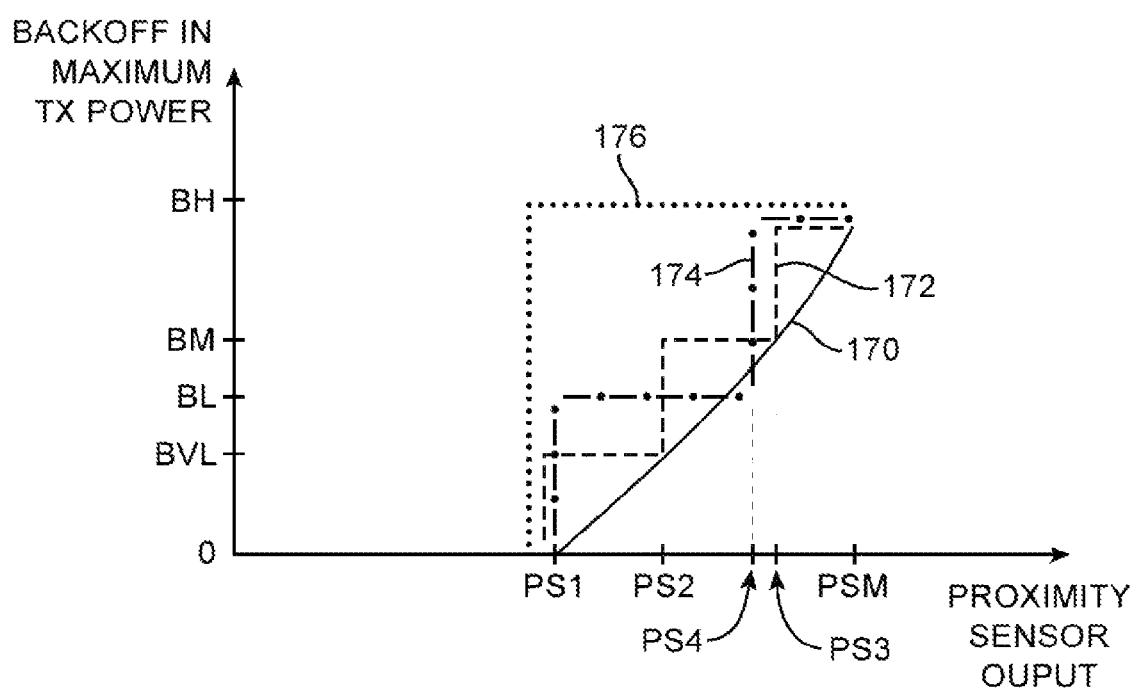
FIG. 9 is a graph in which transmit power backoff levels have been plotted as a function of proximity sensor output for four illustrative power backoff schemes of the type that may be used for one or more antennas in an electronic device in accordance with an embodiment of the present invention.
Figure 10:
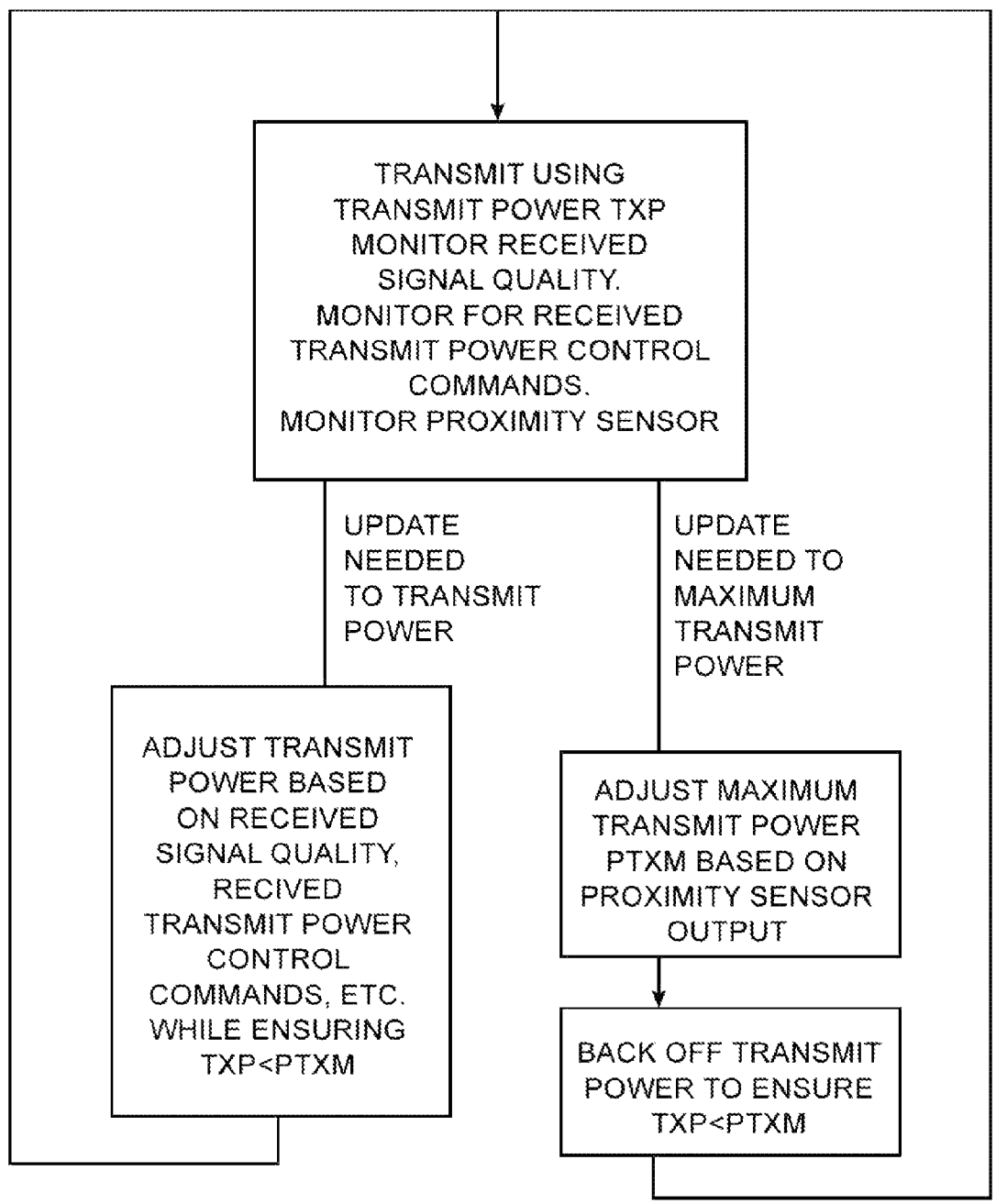
FIG. 10 is a flow chart of illustrative steps involved in adjusting wireless transmitter power levels in an electronic device in accordance with an embodiment of the present invention.

FIG. 9 is a graph with four illustrative curves corresponding to four respective control schemes for reducing maximum transmit power as a function of measured proximity sensor output.

As shown by illustrative curve 170, one way in which device 10 may reduce the maximum transmit power setting in device 10 as a function of proximity sensor output involves changing the maximum transmit power setting continuously as a function of changes in proximity sensor output. With this type of arrangement, relatively low proximity sensor outputs (i.e., proximity sensor outputs below PS1) correspond to situations in which the maximum transmit power for device 10 is maintained at its absolute maximum (i.e., P1 of FIG. 7, because the backoff amount is zero). Other proximity sensor output values (i.e., proximity sensor outputs between PS1 and PSM) correspond to correspondingly reductions in maximum transmit power level (e.g., to a continuously variable amount between P1 and P2 in the FIG. 7 example). At high measured proximity sensor signal values such as maximum value PSM, the amount by which the maximum transmit power is backed off (reduced) is maximized (i.e., maximum backoff value BH). In this situation, the maximum transmit power for transmitting wireless signals with circuitry 34 is set at P1-BH. Due to the continuous nature of curve 170, any proximity sensor output level between PS1 and PSM will correspond to a respective unique maximum transmit power reduction value (backoff value).

Curve 172 corresponds to an illustrative control scenario in which device 10 backs off the maximum transmit power by one of four different amounts based on proximity sensor output value. When the proximity sensor output is less than PS1, the backoff amount is zero. When the proximity sensor output is between PS1 and PS2, the backoff amount applied to the maximum transmit power will be BVL. When the proximity sensor output is between PS2 and PS3, control circuitry 28 will reduce the maximum transmit power by the amount BM. In response to measuring a proximity sensor output between PS3 and PSM, control circuitry 28 will reduce the maximum transmit power level in device 10 from P1 to P1-BH (i.e., the maximum backoff power level of BH will be applied).

In the scenario illustrated by curve 174, there are three different backoff power levels. In response to detection of a proximity sensor output below PS1, the backoff power level is set to zero (i.e., the maximum transmit power will be P1). In response to a proximity sensor output between PS1 and PS4, the backoff power level will be set to non-zero amount BL (i.e., the maximum transmit power level will be reduced from P1 to P1-BL). When the proximity sensor output is between PS4 and PSM, a maximum non-zero reduction of BH in the maximum transmit power will be applied. Examples of non-zero backoff power amounts that may be used by device 10 are −3 dB, −4.5 dB, and −6 dB (as examples). Higher or lower amounts of backoff power may be applied to the maximum transmit power level if desired.

In the scenario illustrated by curve 176, measured proximity sensor output levels below PS1 will result in no backoff being applied to the maximum transmit power, whereas measured proximity sensor output levels above PS1 will result in a backoff of BH in the maximum transmit power.

Other types of maximum transmit power backoff scheme may be used if desired. For example, more backoff levels may be used, fewer backoff levels may be used, the backoff levels that are selected may be selected based on data from two or more proximity sensors 150, the backoff levels that are selected may be selected based on data from proximity sensor 150 in combination with data from a non-proximity sensor such as connector sensor 53 and/or magnetic sensor 51, the backoff levels that are selected may be based solely on data from non-proximity sensors, the backoff levels that are selected may be based on other combinations of sensors, etc.

Consider, as an example, a scenario in which device 10 has a removable cover. The cover may have magnets. When the cover is removed from device 10, magnetic sensors 51 may detect the absence of the magnetic field that would otherwise be present due to the magnets in the cover. When the cover is present in device 10, magnetic sensors 48 may detect a magnetic field from the magnets that are embedded in the cover. The use of cover detection sensors such as magnetic sensors 51 thereby allow device 10 to monitor the status of the cover (i.e., present or not present on device 10).

The way in which device 10 alters the transmit power of transceiver 154 and power amplifier 156 can be based at least partly on the status of the cover. If, for example, no cover is present, the backoff scheme of curve 176 may be used. If, however, the cover is present, the backoff scheme of curve 174 may be used.

As another example, consider a configuration for device 10 in which antennas 40 are deployed asymmetrically within housing 12. There may be, for example, one antenna 40 mounted to operate primarily through the rear of device 10 and another antenna 40 that is mounted so as to operate primarily through the front of device 10. The rear antenna may be more prone to producing emitted radiation that is a concern for specific absorbed radiation levels, so device 10 may back off maximum transmit power for the rear-mounted antenna more aggressively than for the front antenna as a function of measured proximity sensor output. The proximity sensor output in this type of scheme may be provided using two proximity sensors, each of which is associated with a respective antenna (front or rear), or may be provided using a shared proximity sensor that can produce proximity sensor output that is indicative of whether an external object is adjacent to the front or rear antenna.

Closed loop feedback arrangements such as the antenna-based proximity sensor arrangement of FIG. 5 may be used to gather information on antenna detuning as a function of proximity between device 10 and external object 152. With this type of configuration, device 10 may make adjustments to maximum transmit power levels based on the output of the antenna-based proximity sensor. Device 10 may also compare the antenna-based proximity sensor data (antenna impedance data) with data from other proximity sensors (e.g., a capacitive proximity sensor such as a capacitive proximity sensor having capacitive electrodes formed from part of the antenna, etc.) and can adjust output power P differently when antenna 40 is loaded more than proximity sensor 150 or vice versa (e.g., by imposing different backoff power levels as a function of the ratio between the antenna-based proximity sensor and the capacitive proximity sensor output).

Accessories such as covers, dock accessories such as speakers and charging docks with connectors such as connector 134, and other equipment with connectors 132 or structures that affect wireless performance can be characterized in advance of use of device 10. For example, a cover can be characterized to determine how much power is lost on transmission and reception of signals due to absorption by the cover. If 1 dB of signal strength is lost due to passing the signal through the cover, device 10 can increase output power by 1 dB when the cover is detected to compensate. When device 10 senses (by using connector sensor 53) that device 10 has been coupled to an accessory such as a dock or other external equipment 128 (i.e., when sensor 53 detects that connector 132 is present in connector 136), device 10 can conclude that proximity sensor data indicating the presence of a nearby external object is supplying its output due to the presence of the dock or other external accessory, rather than the presence of a human body part in the vicinity of antenna 40. Device 10 can therefore continue to transmit output signals with a nominal maximum transmit power level (i.e., the backoff amount may be reduced to zero or another small value whenever a connector is detected, effectively ignoring the proximity sensor data in scenarios in which device 10 is docked).

Time-based measurements may be used to evaluate the usage of device 10. If device 10 remains static for a relatively long period of time, as indicated by data from sensors such as motion sensors 43, device 10 may, as an example, conclude that device 10 is resting on a table and not the legs of a user.

In this situation, device 10 can decline to back off the maximum transmit power level (i.e., the backoff level may be set to zero).

The ratio between sensor data values from different sensors in device 10 may be used in assessing the environment in which device 10 is being used. For example, if motion levels are low but temperatures are high, it may be concluded that device 10 is resting statically on a user's legs and not a table.

Camera output from camera 49 can help determine how device 10 is being used. For example, if a rear-facing camera is capturing black or static image data, device 10 can conclude that device 10 is resting on a table and should not be subjected to reductions in maximum transmit power level based on proximity sensor output.

The foregoing is merely illustrative of the principles of this invention and various modifications can be made by those skilled in the art without departing from the scope and spirit of the invention.

What is claimed is:

1. An electronic device, comprising:
   control circuitry;
   an antenna;
   wireless circuitry that transmits signals through the antenna at a transmit power that is capped at a maximum transmit power level by the control circuitry; and
   a proximity sensor that produces a proximity sensor output indicative of whether an external object is adjacent to the antenna, wherein the control circuitry is configured to back off the maximum transmit power by one of at least three different amounts based on the proximity sensor output.

2. The electronic device defined in claim 1 wherein the control circuitry is configured to monitor received signal strength through the antenna and wireless circuitry and wherein the control circuitry is configured to adjust the transmit power based on the received signal strength.

3. The electronic device defined in claim 1 wherein the control circuitry is configured to adjust the transmit power based on received transmit power commands from a wireless base station.

4. The electronic device defined in claim 1 wherein the proximity sensor comprise an antenna-based proximity sensor.

5. The electronic device defined in claim 4 wherein the antenna-based proximity sensor comprises a coupler and phase and magnitude detection circuitry for monitoring antenna impedance variations.

6. The electronic device defined in claim 1 wherein the proximity sensor comprises a capacitive proximity sensor.

7. The electronic device defined in claim 1 further comprising a motion sensor, wherein the control circuitry is configured to back off the maximum transmit power based at least partly on information from the motion sensor.

8. The electronic device defined in claim 1 further comprising a connector sensor, wherein the control circuitry is configured to back off the maximum transmit power based at least partly on information from the connector sensor.

9. The electronic device defined in claim 1 further comprising a magnetic sensor, wherein the control circuitry is configured to back off the maximum transmit power based at least partly on information from the magnetic sensor.

10. The electronic device defined in claim 1 further comprising an additional antenna and an additional proximity sensor, wherein the control circuitry is configured to back off a maximum transmit power for the additional antenna based on proximity sensor output from the additional proximity sensor.

11. An electronic device, comprising:
    control circuitry;
    antenna structures;
    wireless circuitry including power amplifier circuitry that transmits radio-frequency signals through the antenna at a transmit power that is capped at a maximum transmit power level by the control circuitry;
    a proximity sensor that produces a proximity sensor output indicative of whether an external object is adjacent to the antenna structures, wherein the control circuitry is configured to back off the maximum transmit power by a first non-zero amount when the proximity sensor output is between a first proximity sensor output level and a second proximity sensor output level and is configured to back off the maximum transmit power by a second non-zero amount when the proximity sensor output is between the second proximity sensor output level and a third proximity sensor output level; and
    a magnetic sensor, wherein the control circuitry is configured to back off the maximum transmit power based at least partly on data from the magnetic sensor.

12. The electronic device defined in claim 11 further comprising a connector sensor that detects whether a connector has been connected to the electronic device, wherein the control circuitry is configured to back off the maximum transmit power based at least partly on data from the connector sensor.

13. The electronic device defined in claim 11 further comprising a motion sensor, wherein the control circuitry is configured to adjust the maximum transmit power based at least partly on data from the motion sensor.

14. The electronic device defined in claim 11, wherein the magnetic sensor is configured to identify whether a cover for the electronic device is present over the electronic device and the control circuitry is configured to back off the maximum transmit power based at least partly on whether the magnetic sensor identifies that the cover is present over the electronic device.

15. The electronic device defined in claim 14, wherein the control circuitry is configured to back off the maximum transmit power by the first and second non-zero amounts when the magnetic sensor identifies that the cover is present over the electronic device and the control circuitry is further configured to back off the maximum transmit power by a third non-zero amount that is different from the first and second non-zero amounts when the proximity sensor output is between the first and third proximity sensor output levels and when the magnetic sensor identifies that the cover is not present over the electronic device.

16. An electronic device, comprising:
    a first antenna;
    a second antenna;
    sensor circuitry that gathers proximity sensor data and additional sensor data;
    control circuitry; and
    wireless circuitry that transmits radio-frequency signals through the first and second antennas at first and second transmit powers capped respectively at first and second maximum transmit powers by the control circuitry, wherein the control circuitry is configured to adjust the first maximum transmit power using a first maximum transmit power backoff scheme in which the first maximum transmit power is reduced by a first set of non-zero amounts based on the proximity sensor data and using a second maximum transmit power backoff scheme in which the first maximum transmit power is reduced by a second set of non-zero amounts based on the proximity sensor data, the second set of non-zero amounts being different from the first set of non-zero amounts, and the control circuitry being further configured to select a given one of the first and second backoff schemes for use based on the additional sensor data.

17. The electronic device defined in claim 16 wherein the control circuitry is configured to back off the first maximum transmit power by a different amount than the second maximum transmit power based on the proximity sensor data.

18. The electronic device defined in claim 17 further comprising at least one capacitive proximity sensor that generates at least part of the proximity sensor data.

19. The electronic device defined in claim 17 further comprising first and second proximity sensors that produce the proximity sensor data.

20. The electronic device defined in claim 19 wherein the control circuitry is configured to apply a first backoff power to the first maximum transmit power based on proximity sensor data from the first proximity sensor and is configured to apply a second backoff power to the second maximum transmit power based on proximity sensor data from the second proximity sensor and wherein the first and second backoff powers are each selected from at least three distinct backoff power values.

21. The electronic device defined in claim 16 further comprising:
- a magnetic sensor; and
- a connector sensor, wherein the magnetic sensor and the connector sensor generate the additional sensor data.

* * * * *